United States Patent
Holder et al.

(10) Patent No.: US 7,417,981 B2
(45) Date of Patent: Aug. 26, 2008

(54) METHOD AND APPARATUS FOR ENHANCED INTERNET TELEPHONY

(75) Inventors: Louis Holder, Princeton Jct., NJ (US); Jeffrey Citron, Edison, NJ (US)

(73) Assignee: Vonage Holdings Corp., Edison, NJ (US)

( * ) Notice: Subject to any disclaimer, the term of this patent is extended or adjusted under 35 U.S.C. 154(b) by 531 days.

(21) Appl. No.: 10/684,593

(22) Filed: Oct. 15, 2003

(65) Prior Publication Data

US 2005/0083908 A1    Apr. 21, 2005

(51) Int. Cl.
*H04L 12/56* (2006.01)
(52) U.S. Cl. .................................... 370/352
(58) Field of Classification Search ......... 370/351–356, 370/252, 420, 260–270, 230, 228, 401, 493, 370/463, 389, 395, 359, 384, 432, 390, 392, 370/517, 236; 455/3.05, 90.2, 412.1, 435.1, 455/433; 348/14.01–14.05; 379/210.01, 379/221.01, 266.1, 93.17, 100.06, 266.08, 379/334, 114.22, 114, 386, 418, 88.12, 220, 379/392, 229, 112, 199, 144, 145, 900, 903, 379/93, 91, 100.05, 100.15; 725/116, 123, 725/114, 127; 709/206, 230, 235, 227, 203, 709/228, 217, 220, 246; 713/201; 340/825.52, 340/870, 511, 527, 531
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,782,485 A | 11/1988 | Gollub | |
| 4,935,956 A * | 6/1990 | Hellwarth et al. | 379/144.02 |
| 5,452,289 A | 9/1995 | Sharma et al. | |
| 5,526,353 A | 6/1996 | Henley et al. | |
| 5,623,490 A | 4/1997 | Richter et al. | |
| 5,966,427 A | 10/1999 | Shaffer et al. | |
| 5,995,491 A | 11/1999 | Richter et al. | |
| 6,014,437 A | 1/2000 | Acker et al. | |
| 6,067,516 A | 5/2000 | Levay et al. | |
| 6,084,956 A | 7/2000 | Turner et al. | |
| 6,092,115 A * | 7/2000 | Choudhury et al. | 709/235 |
| 6,097,804 A | 8/2000 | Gilbert et al. | |
| 6,104,706 A | 8/2000 | Richter et al. | |
| 6,115,460 A | 9/2000 | Crowe et al. | |
| 6,115,468 A | 9/2000 | De Nicolo | |
| 6,118,860 A | 9/2000 | Hillson et al. | |
| 6,122,364 A | 9/2000 | Petrunka et al. | |
| 6,128,379 A | 10/2000 | Smyk | |
| 6,137,869 A | 10/2000 | Voit et al. | |
| 6,138,072 A | 10/2000 | Nagai | |

(Continued)

OTHER PUBLICATIONS

Fineberg, V.; A practical architecture for implementing end-to-end QoS in an IP network Communications Magazine, IEEE vol. 40, Issue 1, Jan. 2002 pp. 122-130.*

(Continued)

*Primary Examiner*—Wing Chan
*Assistant Examiner*—Prenell Jones

(57) ABSTRACT

A method and apparatus for enhanced Internet telephony ensures that communication between a source and destination is not interrupted by common network address translation. According to one aspect of the invention, communication may continue through a router that employs network address translation.

52 Claims, 3 Drawing Sheets

U.S. PATENT DOCUMENTS

| | | | |
|---|---|---|---|
| 6,167,042 A | 12/2000 | Garland et al. | |
| 6,169,741 B1* | 1/2001 | LeMaire et al. | 370/401 |
| 6,175,565 B1 | 1/2001 | McKinnon et al. | |
| 6,178,239 B1 | 1/2001 | Kishinsky et al. | |
| 6,185,285 B1 | 2/2001 | Relyea et al. | |
| 6,188,762 B1 | 2/2001 | Shooster | |
| 6,195,425 B1 | 2/2001 | Farris | |
| 6,226,286 B1 | 5/2001 | Danne et al. | |
| 6,226,361 B1 | 5/2001 | Koyama | |
| 6,243,443 B1 | 6/2001 | Low et al. | |
| 6,249,576 B1 | 6/2001 | Sassin et al. | |
| 6,266,405 B1 | 7/2001 | Madour et al. | |
| 6,272,126 B1* | 8/2001 | Strauss et al. | 370/352 |
| 6,282,281 B1 | 8/2001 | Low | |
| 6,282,284 B1 | 8/2001 | Dezonno et al. | |
| 6,292,553 B1 | 9/2001 | Fellingham et al. | |
| 6,298,064 B1 | 10/2001 | Christie | |
| 6,304,572 B1 | 10/2001 | Christie | |
| 6,304,637 B1 | 10/2001 | Mirashrafi et al. | |
| 6,304,653 B1 | 10/2001 | O'Neal et al. | |
| 6,310,941 B1 | 10/2001 | Crutcher et al. | |
| 6,311,182 B1 | 10/2001 | Colbath et al. | |
| 6,320,951 B1 | 11/2001 | Shtivelman et al. | |
| 6,327,572 B1 | 12/2001 | Morton et al. | |
| 6,330,317 B1 | 12/2001 | Garfinkel | |
| 6,337,899 B1 | 1/2002 | Alcendor et al. | |
| 6,343,115 B1 | 1/2002 | Foladare et al. | |
| 6,349,132 B1 | 2/2002 | Wesemann et al. | |
| 6,351,464 B1 | 2/2002 | Galvin et al. | |
| 6,351,526 B1 | 2/2002 | Shaffer et al. | |
| 6,366,577 B1 | 4/2002 | Donovan | |
| 6,366,661 B1 | 4/2002 | Devillier et al. | |
| 6,373,836 B1 | 4/2002 | Deryugin et al. | |
| 6,373,936 B1 | 4/2002 | Raniere et al. | |
| 6,373,938 B1 | 4/2002 | Palacios et al. | |
| 6,385,209 B1 | 5/2002 | Skirmont et al. | |
| 6,389,119 B1 | 5/2002 | McBride | |
| 6,393,476 B1 | 5/2002 | Barnhouse et al. | |
| 6,400,820 B1 | 6/2002 | Edwards et al. | |
| 6,404,746 B1 | 6/2002 | Cave et al. | |
| 6,404,882 B2 | 6/2002 | Fellner et al. | |
| 6,404,884 B1 | 6/2002 | Marwell et al. | |
| 6,408,062 B1 | 6/2002 | Cave | |
| 6,408,065 B1 | 6/2002 | O'Neal et al. | |
| 6,411,697 B1 | 6/2002 | Creamer et al. | |
| 6,411,704 B1 | 6/2002 | Pelletier et al. | |
| 6,415,269 B1 | 7/2002 | Dinwoodie | |
| 6,421,437 B1 | 7/2002 | Slutsman | |
| 6,424,707 B1 | 7/2002 | Chatterjee | |
| 6,430,175 B1 | 8/2002 | Echols et al. | |
| 6,430,176 B1 | 8/2002 | Christie, IV | |
| 6,430,289 B1 | 8/2002 | Liffick | |
| 6,434,143 B1 | 8/2002 | Donovan | |
| 6,442,242 B1 | 8/2002 | McAllister et al. | |
| 6,446,127 B1* | 9/2002 | Schuster et al. | 709/227 |
| 6,452,932 B1 | 9/2002 | Christie | |
| 6,456,618 B2 | 9/2002 | Kozdon et al. | |
| 6,463,052 B1 | 10/2002 | Christie | |
| 6,466,570 B1 | 10/2002 | Low et al. | |
| 6,470,010 B1 | 10/2002 | Szviatovszki et al. | |
| 6,473,429 B1 | 10/2002 | Christie | |
| 6,480,484 B2 | 11/2002 | Morton | |
| 6,480,581 B1 | 11/2002 | Wu et al. | |
| 6,487,200 B1 | 11/2002 | Fraser | |
| 6,493,337 B1 | 12/2002 | Stevenson, III | |
| 6,493,437 B1 | 12/2002 | Olshansky | |
| 6,496,477 B1* | 12/2002 | Perkins et al. | 370/228 |
| 6,504,921 B2 | 1/2003 | Kotik et al. | |
| 6,510,219 B1 | 1/2003 | Wellard et al. | |
| 6,519,232 B1 | 2/2003 | Becher | |
| 6,519,333 B1 | 2/2003 | Malik | |
| 6,539,077 B1 | 3/2003 | Ranalli et al. | |
| 6,542,589 B1 | 4/2003 | Baskin | |
| 6,553,023 B1 | 4/2003 | Yamamiya et al. | |
| 6,563,793 B1* | 5/2003 | Golden et al. | 370/236 |
| 6,564,261 B1 | 5/2003 | Gudjonsson et al. | |
| 6,567,398 B1 | 5/2003 | Aravamudan et al. | |
| 6,567,419 B1 | 5/2003 | Yarlagadda | |
| 6,571,212 B1* | 5/2003 | Dent | 704/270.1 |
| 6,577,712 B2 | 6/2003 | Larsson et al. | |
| 6,584,094 B2 | 6/2003 | Maroulis et al. | |
| 6,584,098 B1* | 6/2003 | Dutnall | 370/354 |
| 6,584,186 B1 | 6/2003 | Aravamudan et al. | |
| 6,584,510 B2 | 6/2003 | Anttila | |
| 6,587,836 B1 | 7/2003 | Ahlberg et al. | |
| 6,597,685 B2 | 7/2003 | Miloslavsky et al. | |
| 6,614,786 B1* | 9/2003 | Byers | 370/353 |
| 6,614,899 B1* | 9/2003 | Sollee et al. | 379/218.01 |
| 6,621,899 B2 | 9/2003 | Dezonno et al. | |
| 6,628,760 B2 | 9/2003 | Mirashrafi et al. | |
| 6,633,561 B2 | 10/2003 | Christie | |
| 6,650,890 B1* | 11/2003 | Irlam et al. | 455/412.1 |
| 6,665,294 B2 | 12/2003 | Christie | |
| 6,665,389 B1 | 12/2003 | Haste, III | |
| 6,665,392 B1 | 12/2003 | Wellner et al. | |
| 6,668,055 B2 | 12/2003 | Marwell et al. | |
| 6,681,252 B1* | 1/2004 | Schuster et al. | 709/227 |
| 6,690,780 B2 | 2/2004 | Kotik et al. | |
| 6,694,007 B2 | 2/2004 | Lang et al. | |
| 6,697,475 B1 | 2/2004 | McLampy et al. | |
| 6,707,811 B2* | 3/2004 | Greenberg et al. | 370/352 |
| 6,707,906 B1 | 3/2004 | Ben-Chanoch | |
| 6,711,160 B2 | 3/2004 | Chan et al. | |
| 6,714,988 B2 | 3/2004 | Takemoto et al. | |
| 6,718,031 B2 | 4/2004 | Fellner et al. | |
| 6,724,755 B1 | 4/2004 | Kim | |
| 6,731,630 B1 | 5/2004 | Schuster et al. | |
| 6,731,642 B1* | 5/2004 | Borella et al. | 370/401 |
| 6,731,741 B1 | 5/2004 | Fourcand et al. | |
| 6,741,586 B1 | 5/2004 | Schuster et al. | |
| 6,748,057 B2 | 6/2004 | Ranalli et al. | |
| 6,760,429 B1 | 7/2004 | Hung et al. | |
| 6,763,226 B1* | 7/2004 | McZeal, Jr. | 455/90.2 |
| 6,765,931 B1* | 7/2004 | Rabenko et al. | 370/493 |
| 6,769,020 B2 | 7/2004 | Miyazaki et al. | |
| 6,771,637 B1 | 8/2004 | Suzuki et al. | |
| 6,775,368 B1 | 8/2004 | Lee et al. | |
| 6,778,661 B1 | 8/2004 | Yumoto et al. | |
| 6,798,873 B2 | 9/2004 | Vardi et al. | |
| 6,819,752 B2 | 11/2004 | Raniere et al. | |
| 6,822,945 B2* | 11/2004 | Petrovykh | 370/270 |
| 6,839,359 B2 | 1/2005 | Skirmont et al. | |
| 6,839,421 B2 | 1/2005 | Esparza et al. | |
| 6,870,845 B1* | 3/2005 | Bellovin et al. | 370/392 |
| 6,892,230 B1* | 5/2005 | Gu et al. | 709/220 |
| 2001/0005412 A1 | 6/2001 | Light et al. | |
| 2001/0005415 A1 | 6/2001 | Grunsted et al. | |
| 2001/0014919 A1 | 8/2001 | Tzirin | |
| 2002/0007391 A1 | 1/2002 | Suzuki | |
| 2002/0034284 A1* | 3/2002 | Kang | 379/100.06 |
| 2002/0049815 A1* | 4/2002 | Dattatri | 709/206 |
| 2002/0049860 A1 | 4/2002 | Koistinen | |
| 2002/0055879 A1 | 5/2002 | Wengrovitz et al. | |
| 2002/0071429 A1* | 6/2002 | Donovan | 370/352 |
| 2002/0085535 A1* | 7/2002 | Williams | 370/352 |
| 2002/0095516 A1 | 7/2002 | Nada | |
| 2002/0112073 A1 | 8/2002 | McLampy et al. | |
| 2002/0114430 A1 | 8/2002 | Murata | |
| 2002/0120760 A1* | 8/2002 | Kimchi et al. | 709/230 |
| 2002/0126818 A1 | 9/2002 | Cai et al. | |
| 2002/0129131 A1 | 9/2002 | Yamashita | |
| 2002/0150083 A1 | 10/2002 | Fangman et al. | |
| 2002/0176403 A1* | 11/2002 | Radian | 370/352 |
| 2002/0191596 A1* | 12/2002 | Moyano et al. | 370/352 |

| | | |
|---|---|---|
| 2002/0191635 A1* | 12/2002 | Chow et al. .................. 370/463 |
| 2003/0002654 A1* | 1/2003 | Torba .................... 379/266.08 |
| 2003/0005280 A1* | 1/2003 | Bobde et al. ................. 713/150 |
| 2003/0041132 A1 | 2/2003 | Lim et al. |
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1* | 5/2003 | Chang et al. ................. 370/352 |
| 2003/0108064 A1 | 6/2003 | Bilke et al. |
| 2003/0162526 A1 | 8/2003 | Clarisse et al. |
| 2003/0174695 A1* | 9/2003 | Lautenschlager et al. ... 370/352 |
| 2003/0202504 A1 | 10/2003 | Dhara et al. |
| 2003/0212795 A1* | 11/2003 | Harris et al. ................. 709/227 |
| 2004/0028025 A1 | 2/2004 | Chang |
| 2004/0028207 A1 | 2/2004 | Kato |
| 2004/0039938 A1* | 2/2004 | Katz et al. .................. 713/201 |
| 2004/0057415 A1 | 3/2004 | Colson et al. |
| 2004/0114575 A1 | 6/2004 | Morita et al. |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0252683 A1* | 12/2004 | Kennedy et al. ............ 370/389 |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018651 A1* | 1/2005 | Yan et al. .................... 370/352 |
| 2005/0018659 A1* | 1/2005 | Gallant et al. ............... 370/352 |
| 2005/0064862 A1* | 3/2005 | Castrogiovanni et al. .... 455/420 |

OTHER PUBLICATIONS

Melvin, H.; Murphy, L.; Time synchronization for VoIP quality of service Internet Computing, IEEE vol. 6, Issue 3, May-Jun. 2002 pp. 57-63.*

Srisuresh et al., "Middlebox Communication Architecture and Framework," RFC 3303, Internet Engineering Task Force (Aug. 2002), available at http://www.ietf.org/rfc/rfc3303.txt (last accessed Aug. 27, 2007).

Rosenberg et al., "NAT Friendly SIP," Internet Engineering Task Force (Jul. 20, 2001), available at http://tools.ietf.org/html/draft-rosenberg-sip-entfw-02 (last accessed Aug. 27, 2007).

* cited by examiner

METHOD AND APPARATUS FOR ENHANCED INTERNET TELEPHONY

BACKGROUND OF THE INVENTION

Today, most common residential broadband deployments are delivered via either cable or DSL modem. Such broadband deployment typically provides customers with a single Ethernet port that grants one public IP address to a single computer device. Given this situation, customers are restricted to using only one computer, and must purchase a router if they desire to share the broadband connection to access, for example, the Internet between more than one of the customer's computer devices.

To transport media and telephone signaling, customers commonly use a Multi Media Terminal Adapter (MTA) coupled between their source device (e.g., a computer or telephone) and their broadband connection. One example of a common Media Terminal Adapter is the Cisco ATA 186 Analog to Telephone Adapter (ATA) manufactured by Cisco Systems, Inc. of San Jose Calif. In the case of Internet telephony, the Media Terminal Adapter operates as a handset to Ethernet adapter that converts traditional telephone analog signals into Internet packets. The packets are then sent using, for example, a standard protocol such as Session Initiation Protocol (SIP) on route towards their destination.

FIG. 1 is a schematic representation of an example user Internet Telephony environment. In FIG. 1, a cable modem 10 provides access to the Internet 20. In the FIG. 1 example, the user employs an intermediate communication point, e.g., router 30 to provide multiple devices access to the Internet 20. The router 30 assigns respective private dynamic IP addresses to the Media Terminal Adapter 40 and to the computer 50. As shown in the FIG. 1 example, the Media Terminal Adapter 40 is coupled to a common telephone handset 60. The Media Terminal Adapter 40 receives signals from the handset 60, creates packets and sends data packets to the Router 30, which in turn sends them to the cable modem 10 and eventually to the Internet 20.

A major drawback of the above typical environment is the difficulty in accommodating the Network Address Translation (NAT) that is typically implemented by the router 30. As is commonly understood, a Dynamic Host Configuration Protocol server running on the router 30 assigns private dynamic IP addresses to the Media Terminal Adapter 40 and computer 50; thus effecting Network Address Translation (NAT).

When a user wishes to initiate a call and activates the telephone handset 60, the handset sends signals to the Media Terminal Adapter 40. The Media Terminal Adapter 40 then begins the communication/registration process with an Internet telephone service provider. The communication between the Media Terminal Adapter 40 and a server of the Internet telephone service provider employs a standard protocol such as Session Initiation Protocol. But, the router 30 performs the Network Address Translation on a timed basis. As is commonly known, typical routers used in home environments assign private IP addresses to devices connected to the router. But, those addresses are valid only for a limited time. Thus, after the limited time expires, the private address is no longer assigned to a given device, such as the Media Terminal Adapter 40. As a result, the SIP messages sent from Internet telephone service provider's server are not passed by the router 30 to the Media Terminal Adapter 40. Consequently, the Media Terminal Adapter 40 can send SIP messages, but is not able to receive packets from the Internet telephone service provider's server due to the router 30 losing the originating outbound port and making communication to an MTA located behind a router impossible.

FIG. 2 is a schematic representation of an example environment that addresses the issue of router 30 losing an outbound port during an Internet telephone connection. In the FIG. 2 example, at the Internet telephone service provider a destination, e.g., a pre-proxy server 70 receives messages from the router 30. Pre-proxy server 70 records the private IP address of the Media Terminal Adapter 40 during, for example, the SIP registration process. It also records the network address translation communication port assigned by the router 30 to the Media Terminal Adapter 40 to and from which it will send and receive messages, such as SIP messages. Upon registration, the Media Terminal Adapter 40 passes fields used to communicate with the pre-proxy server 70. Examples of fields that can be passed include, for example, the private IP address of the Media Terminal Adapter 40, the public IP address of the router 30, and port information. After the pre-proxy server 70 receives the information from the Media Terminal Adapter 40, the pre-proxy server 70 periodically sends, for example, blank UDP messages to the Media Terminal Adapter 40, which contain the same destination and source address as a typical SIP message would have. Other messages could be used instead of the UDP message. The message used should prompt the Media Terminal Adapter 40 to send a response to the pre-proxy server 70. The pre-proxy server 70 sends, for example, the UDP message to the router 30 using the public IP address of the router 30 and the port information received in the message from the router 30. The pre-proxy server 70 sends, for example, the UDP within the limited time that the router 30 maintains that private address assigned to the Media Terminal Adapter. The router 30 accordingly routes the message to the destination designated in the message from the pre-proxy server 70. The pre-proxy server 70 also maintains the private and public IP addresses of the MTA and rewrites the headers in the actual SIP messages based on this information.

The above solution worked, but it did not solve the network address translation problem for all routers. For example, some routers would close the outbound port if the device behind the router's network address translation did not send an outbound message. Thus, there is a need for a solution to the problem, in Internet telephony, of the network address translation that a router performs as a part of its intended operation.

SUMMARY OF THE INVENTION

It is an object of the present invention to provide a method and apparatus for enhanced Internet telephony that avoids the above drawbacks.

It is another object of the present invention to provide a method and apparatus for enhanced Internet telephony that allows the use of Session Initiated Protocol technology.

It is a further object of the present invention to provide a method and apparatus for enhanced Internet telephony that allows the use of Session Initiated Protocol technology within environments employing network address translation.

It is still another object of the present invention to provide a method and apparatus for enhanced Internet telephony that allows the use of Session Initiated Protocol technology with routers employing network address translation.

To achieve the above and other object, the present invention provides a method for providing enhanced Internet telephony that includes receiving a message from a source at an intermediate point; sending at least a portion of the message from the intermediate point to a destination over the Internet; sending a response to the message from the destination to the intermediate point over the Internet; sending the response from the intermediate point to the source; repeatedly sending other messages from the destination over the Internet to the intermediate point; sending at least a portion of corresponding ones of the other messages from the intermediate point to the source; and sending responses to the portions of the other messages from the source to the intermediate point.

DESCRIPTION OF THE PREFERRED EMBODIMENTS

Figure 1:
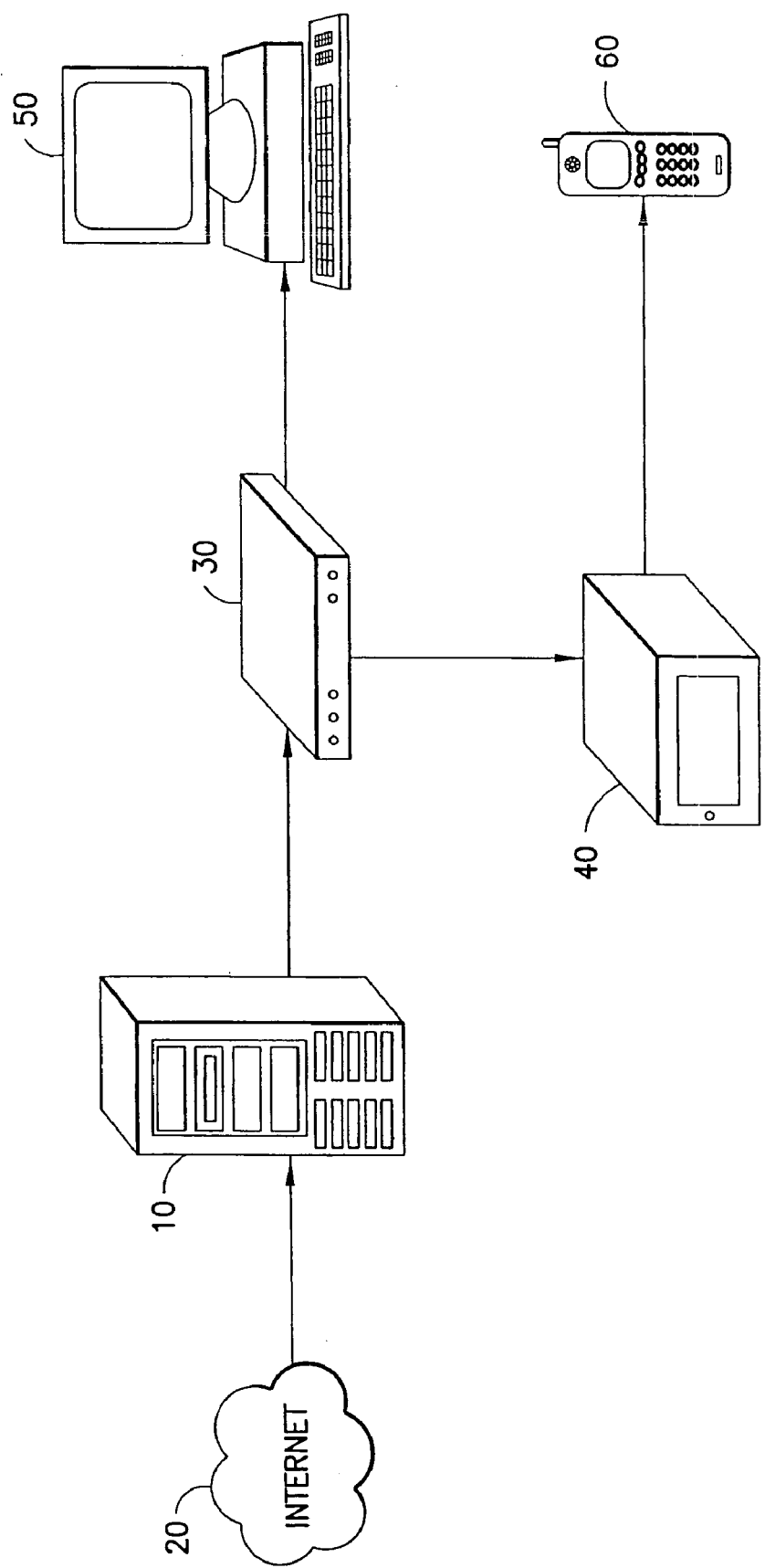
FIG. 1 is a schematic representation of an example user Internet Telephony environment.
Figure 2:
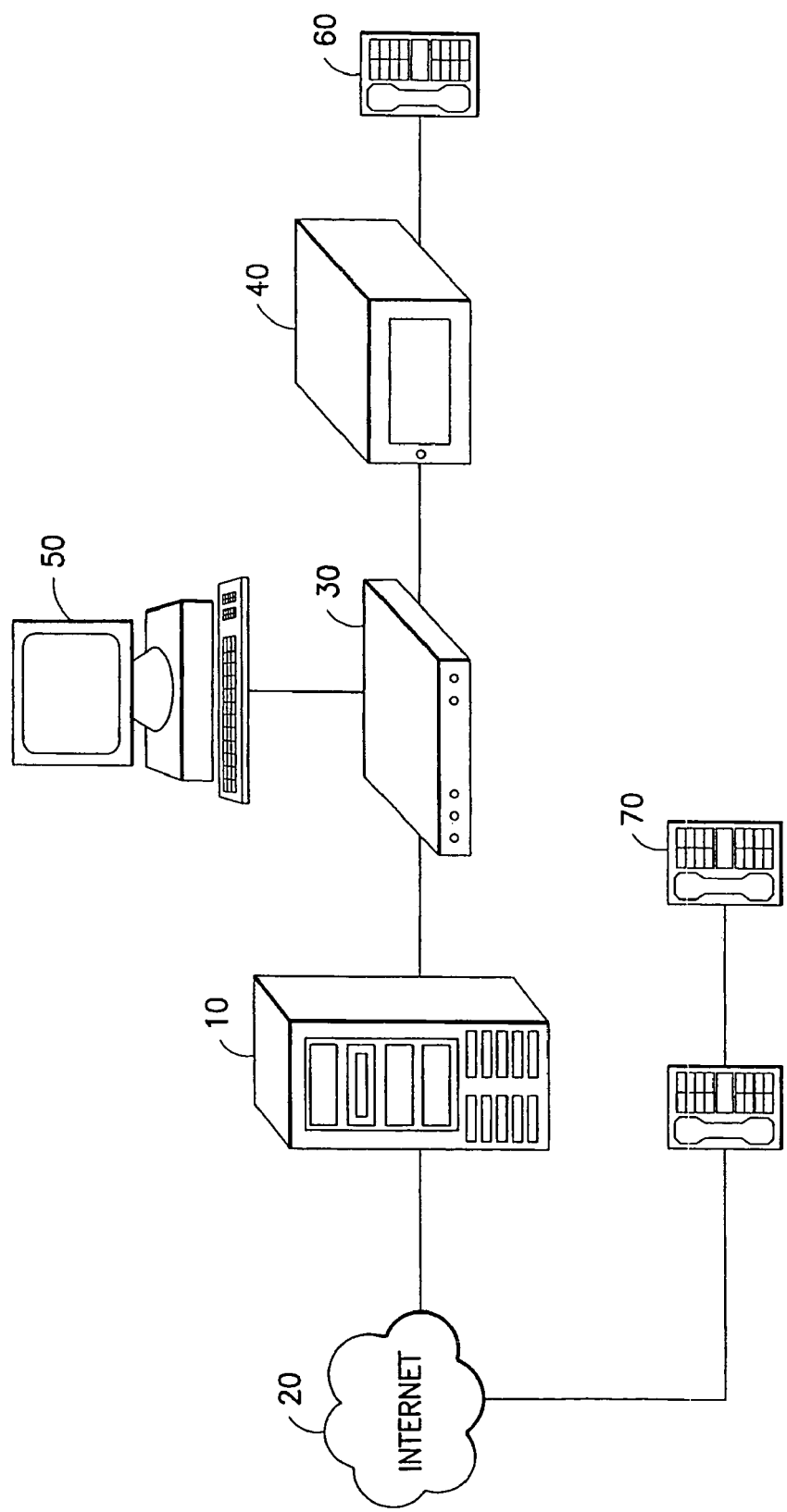
FIG. 2 is a schematic representation of an example environment intended to address the issue of a router losing an outbound port during an Internet telephone connection.
Figure 3:
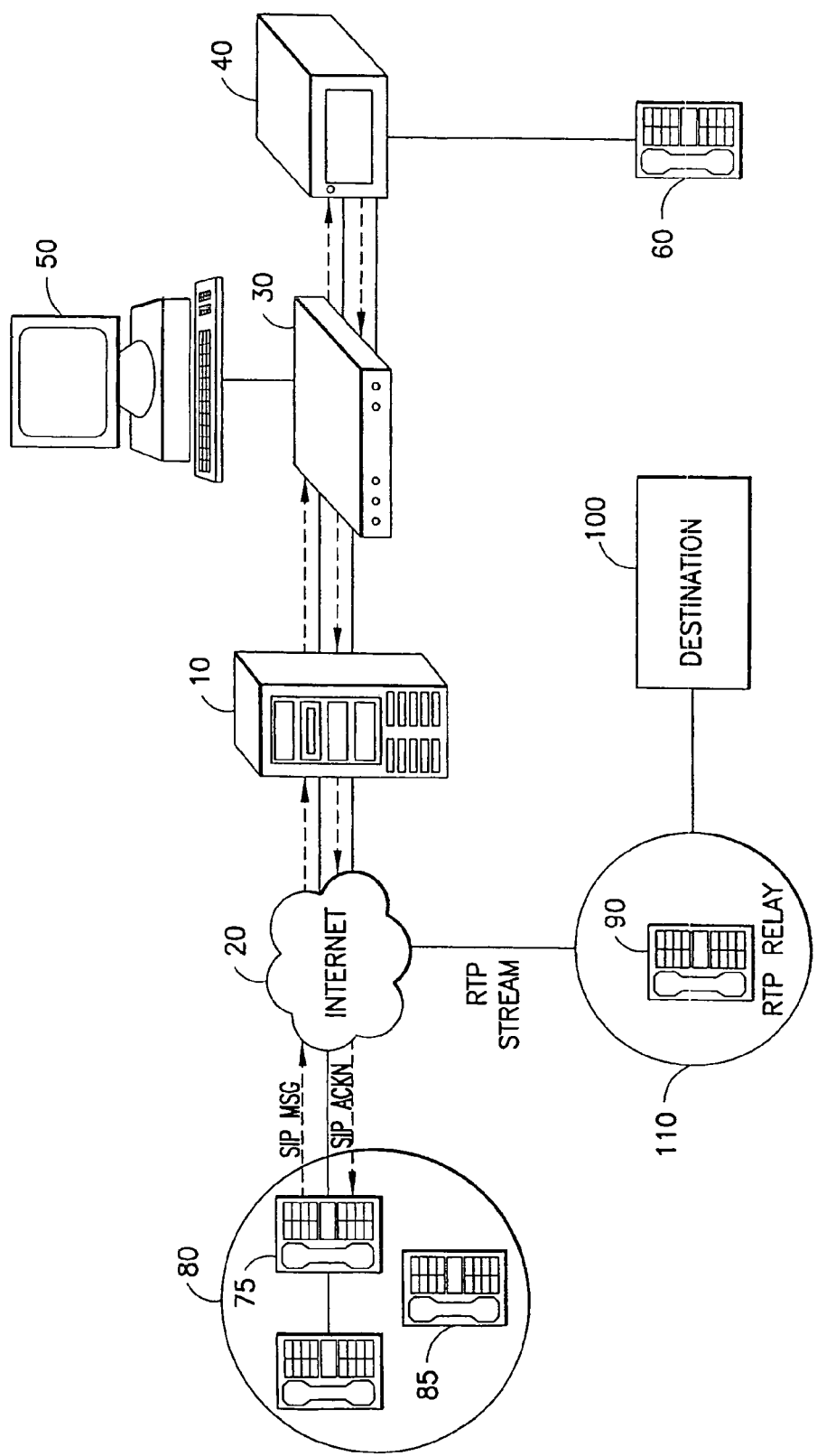
FIG. 3 is a schematic representation of an example environment employing the present invention.

FIG. 3 is a schematic representation of an example environment employing an embodiment of the present invention. In FIG. 3, a user initiates a call using a telephone handset 60. As described above, the media terminal adapter 40 implements standard signaling between itself and an Internet telephony regional data center 80. Once the user has been registered and the destination has provided a SIP acknowledgment of the SIP invite sent by the media terminal adapter 40, communication between the caller 60 and a customer in a destination area 100 proceeds using, for example, Real-time Transport Protocol (RTP) between the caller and a customer in the destination area 100 via the Internet 20 and, for example, a RTP relay 90 in Internet telephony point-of-presence 110 in the destination area 100.

However, with the call set up as described above, the router 30 may close the outbound port after a timeout period. As a result, voice data from the customer in the destination area 110 will not reach the telephone handset 60 behind router 30. To avoid the router 30 timing out and closing the outbound port, an embodiment of the present invention causes the media terminal adapter 40 to send an outbound message to the Internet telephony regional data center 80. One way of accomplishing this is to have the pre-proxy server 75 periodically send an empty SIP notify message to the media terminal adapter 40. The media terminal adapter 40 responds to this notify message in accordance with SIP standards by, for example sending an acknowledgement message. The sending of a message by the media terminal adapter 40 causes the router 30 to keep the outbound port open by, for example restarting the router's timeout period.

Referring to the exemplary embodiment shown in FIG. 3, the Internet telephony regional data center 80 has the pre-proxy server 75 separated from the RTP relay 85. While this separation is not necessary to the present invention, in some environments, it allows additional functionality to be more easily added to the pre-proxy server 75. An example of such additional functionality is the dynamic allocation of the RTP relay 85. The pre-proxy server 75 can allocate the closest RTP relay between the two calling parties. That allocation enables the ability to decrease latency and travel time of the RTP stream. Also as shown in FIG. 3, with the exemplary embodiment, only SIP messages get routed to the Internet telephony regional data center 80. The RTP stream need not travel to the data center, and depending upon the location of the caller and the destination area 100, can travel within a limited geographic area. For example, the telephone handset could be located in California, and the Internet telephony regional data center 80 could be located in New Jersey. If the destination area 100 is also in California, the Internet telephony point of presence in the destination area 90 would be allocated by the pre-proxy server 75 to also be in California. Thus, as noted above, the RTP stream would remain in California; tending to reduce latency and travel time of the RTP stream.

In the above, the pre-proxy server 75 is shown and discussed as a separate computer. This is for convenience of discussion, for purposes of practicing the invention, it does not need to be separate. Instead, the discussed functions that typically would be implemented in a pre-proxy server can be implemented in a computer that is also functioning as a server.

The invention claimed is:

1. A method of providing enhanced Internet telephony comprising steps of:
    (a) receiving a message from a source at an intermediate point between the source and a destination, said intermediate point including at least one port having a time out period within which the destination may send messages to the source via the intermediate point;
    (b) sending at least a portion of the message from the intermediate point to the destination over the Internet;
    (c) sending a response to the message from the destination to the intermediate point over the Internet within the time out period;
    (d) sending the response from the intermediate point to the source;
    (e) sending a reply to the response from the source to the intermediate point;
    (f) preventing the port from timing out by repeatedly sending subsequent messages from the destination over the Internet to the intermediate point;
    (g) sending at least a portion of corresponding ones of the subsequent messages from the intermediate point to the source; and
    (h) sending replies to the portion of the subsequent messages from the source to the intermediate point, wherein the current time out period restarts upon arrival at the intermediate point of a message from the destination.

2. A method according to claim 1, wherein step (f) includes repeatedly sending the subsequent messages at a time interval less than the time out period.

3. A method of providing enhanced Internet telephony according to claim 1, wherein the intermediate point is a router.

4. A method of providing enhanced Internet telephony according to claim 1, wherein the intermediate point assigns a new network address to the at least one port at the end of the time out period.

5. A method of providing enhanced Internet telephony according to claim 4, wherein the intermediate point assigns the new network address according to Dynamic Host Configuration Protocol.

6. A method of providing enhanced Internet telephony according to claim 1, wherein the messages are telephony signaling messages.

7. A method of providing enhanced Internet telephony according to claim 6, wherein the signaling messages are session initiation protocol (SIP) messages.

8. A method of providing enhanced Internet telephony according to claim 1, wherein the repeatedly sent messages are sent according to a timer.

9. A method of providing enhanced Internet telephony according to claim 1, wherein the intermediate point releases a network address from said at least one port at the end of the time out period.

10. A method of providing enhanced Internet telephony comprising steps of:
   (a) receiving a message from a source at an intermediate point between the source and a destination, said intermediate point including at least one port having a time out period within which the destination may send messages to the source via the intermediate point;
   (b) sending at least a portion of the message from the intermediate point to the destination over the Internet;
   (c) sending a response to the message from the destination to the intermediate point over the Internet within the time out period;
   (d) sending the response from the intermediate point to the source;
   (e) sending a reply to the response from the source to the intermediate point;
   (f) preventing the port from timing out by repeatedly sending subsequent messages from the destination over the Internet to the intermediate point;
   (g) sending at least a portion of corresponding ones of the subsequent messages from the intermediate point to the source; and
   (h) sending replies to the portion of the subsequent messages from the source to the intermediate point, wherein the current time out period restarts upon arrival at the intermediate point of a reply from the source.

11. A method according to claim 10, wherein step (f) includes repeatedly sending the subsequent messages at a time interval less than the time out period.

12. A method of providing enhanced Internet telephony according to claim 10, wherein the intermediate point is a router.

13. A method of providing enhanced Internet telephony according to claim 10, wherein the intermediate point assigns a new network address to the at least one port at the end of the time out period.

14. A method of providing enhanced Internet telephony according to claim 13, wherein the intermediate point assigns the new network address according to Dynamic Host Configuration Protocol.

15. A method of providing enhanced Internet telephony according to claim 10, wherein the messages are telephony signaling messages.

16. A method of providing enhanced Internet telephony according to claim 15, wherein the signaling messages are session initiation protocol (SIP) messages.

17. A method of providing enhanced Internet telephony according to claim 10, wherein the repeatedly sent messages are sent according to a timer.

18. A method of providing enhanced Internet telephony according to claim 10, wherein the intermediate point releases a network address from said at least one port at the end of the time out period.

19. An enhanced Internet telephony system comprising:
   a message source;
   an intermediate point between the message source and a destination, including at least one port having a time out period within which the destination may send messages to the source via the intermediate point, said intermediate point being coupled to receive a message from the source and to send at least a portion of the message to the Internet;
   the destination coupled to receive the message from the intermediate point, to send a response to the message to the intermediate point over the Internet within the time out period, and to prevent the port from timing out by repeatedly sending subsequent messages over the Internet to the intermediate point;
   wherein the message source is coupled to the intermediate point so as to send replies to the response message and the subsequent messages and wherein the current time out period restarts upon arrival at the intermediate point of a message from the destination.

20. An enhanced Internet telephony system according to claim 19, wherein the intermediate point assigns a new network address to the at least one port at the end of the time out period.

21. An enhanced Internet telephony system according to claim 20, wherein the intermediate point assigns the new network address according to Dynamic Host Configuration Protocol.

22. An enhanced Internet telephony system according to claim 19, wherein the messages are telephony signaling messages.

23. An enhanced Internet telephony system according to claim 22, wherein the signaling messages are session initiation protocol (SIP) messages.

24. An enhanced Internet telephony system according to claim 19, wherein the repeatedly sent messages are sent according to a timer.

25. An enhanced Internet telephony system according to claim 19, wherein the intermediate point releases a network address from said at least one port at the end of the time out period.

26. An enhanced Internet telephony system according to claim 19, wherein the destination comprises a server coupled to send at least one of the subsequent messages within the time out period.

27. An enhanced Internet telephony system according to claim 26, wherein the source comprises a media terminal adapter.

28. An enhanced Internet telephony system according to claim 19, wherein the intermediate point is a router.

29. An enhanced Internet telephony system comprising:
   a message source;
   an intermediate point between the message source and a destination, including at least one port having a time out period within which the destination may send messages to the source via the intermediate point, said intermediate point being coupled to receive a message from the source and to send at least a portion of the message to the Internet;
   the destination coupled to receive the message from the intermediate point, to send a response to the message to the intermediate point over the Internet within the time out period, and to prevent the port from timing out by repeatedly sending subsequent messages over the Internet to the intermediate point;
   wherein the message source is coupled to the intermediate point so as to send replies to the response message and the subsequent messages and wherein the current time out period restarts upon arrival at the intermediate point of a reply from the message source.

30. An enhanced Internet telephony system according to claim 29, wherein the destination comprises a server coupled to send at least one of the subsequent messages within the time out period.

31. An enhanced Internet telephony system according to claim 30, wherein the source comprises a media terminal adapter.

32. An enhanced Internet telephony system according to claim 29, wherein the intermediate point is a router.

33. An enhanced Internet telephony system according to claim 29, wherein the intermediate point assigns a new network address to the at least one port at the end of the time out period.

34. An enhanced Internet telephony system according to claim 33, wherein the intermediate point assigns the new network address according to Dynamic Host Configuration Protocol.

35. An enhanced Internet telephony system according to claim 29, wherein the messages are telephony signaling messages.

36. An enhanced Internet telephony system according to claim 35, wherein the signaling messages are session initiation protocol (SIP) messages.

37. An enhance Internet telephony system according to claim 29, wherein the repeatedly sent messages are sent according to a timer.

38. An enhanced Internet telephony system according to claim 29, wherein the intermediate point releases a network address from said at least one port at the end of the time out period.

39. In an Internet telephony system comprising:
a message source adapted to generate and receive call setup messages in a signaling packet protocol and to generate and receive communication packet streams in a packet stream protocol,
an intermediate point coupled between the message source and a network, said intermediate unit including at least one port having a time out condition, and
a signaling destination coupled to the network and adapted to generate and receive signaling messages according to the signaling packet protocol;
the improvement wherein the signaling destination prevents the port from meeting the time out condition during a user telephony communication by repeatedly requesting signaling message replies from the message source via the intermediate point and wherein the current time out condition resets upon arrival at the intermediate point of the request for a signaling message reply from the signaling destination.

40. An Internet telephony system according to claim 39, wherein the intermediate point is a router.

41. An Internet telephony system according to claim 39, wherein the intermediate point assigns a new network address to the at least one port when the time out condition is met.

42. An Internet telephony system according to claim 41, wherein the intermediate point assigns the new network address according to Dynamic Host Computer Protocol.

43. An Internet telephony system according to claim 39, wherein the signaling messages are session initiation protocol (SIP) messages.

44. An Internet telephony system according to claim 39, wherein the repeatedly sent messages are sent according to a timer.

45. An Internet telephony system according to claim 39, wherein the intermediate point releases a network address from said at least one port when the time out condition is met.

46. In an Internet telephony system comprising:
a message source adapted to generate and receive call setup messages in a signaling packet protocol and to generate and receive communication packet streams in a packet stream protocol,
an intermediate point coupled between the message source and a network, said intermediate unit including at least one port having a time out condition, and
a signaling destination coupled to the network and adapted to generate and receive signaling messages according to the signaling packet protocol;
the improvement wherein the signaling destination prevents the port from meeting the time out condition during a user telephony communication by repeatedly requesting signaling message replies from the message source via the intermediate point and the current time out condition resets upon arrival at the intermediate point of a signaling message from the message source.

47. An Internet telephony system according to claim 46, wherein the intermediate point is a router.

48. An Internet telephony system according to claim 46, wherein the intermediate point assigns a new network address to the at least one port when the time out condition is met.

49. An Internet telephony system according to claim 48, wherein the intermediate point assigns the new network address according to Dynamic Host Configuration Protocol.

50. An Internet telephony system according to claim 46, wherein the signaling messages are session initiation protocol (SIP) messages.

51. An Internet telephony system according to claim 46, wherein the repeatedly sent messages are sent according to a timer.

52. An Internet telephony system according to claim 46, wherein the intermediate point releases a network address from said at least one port when the time out condition is met.

* * * * *